United States Patent
Miranda (10) Patent No.: US 6,190,741 B1
(45) Date of Patent: Feb. 20, 2001

(54) DOUBLE CORONA TREATMENT

(75) Inventor: Ricardo Miranda, Cowlitz, WA (US)

(73) Assignee: Tetra Laval Holdings & Finance, SA, Pully (CH)

( * ) Notice: Under 35 U.S.C. 154(b), the term of this patent shall be extended for 0 days.

(21) Appl. No.: 09/203,654

(22) Filed: Dec. 2, 1998

(51) Int. Cl.⁷ .............................. B05D 3/14; C08J 3/24; C08J 7/18; H05H 1/00

(52) U.S. Cl. .................... 427/536; 427/491; 427/539; 427/540; 427/492

(58) Field of Search ................. 427/536, 539, 427/540, 491, 492, 358

(56) References Cited

U.S. PATENT DOCUMENTS

| | | | |
|---|---|---|---|
| 3,976,527 | * 8/1976 | Thompson et al. | 427/288 |
| 4,481,289 | * 11/1984 | Honma | 427/536 |
| 4,698,246 | * 10/1987 | Gibbons et al. | 427/536 |
| 4,772,348 | 9/1988 | Hirokawa et al. . | |
| 4,778,557 | 10/1988 | Schrimer . | |
| 4,854,999 | 8/1989 | Schrimer . | |
| 4,861,526 | 8/1989 | Gibbons et al. . | |
| 4,871,406 | 10/1989 | Griffith . | |
| 4,888,223 | 12/1989 | Sugimoto et al. . | |
| 4,996,076 | 2/1991 | Nakaya et al. . | |
| 5,059,459 | 10/1991 | Huffman . | |
| 5,064,692 | * 11/1991 | Hofman et al. | 427/391 |
| 5,091,261 | 2/1992 | Casey et al. . | |
| 5,196,269 | 3/1993 | Kittrell et al. . | |
| 5,234,516 | 8/1993 | Okamura et al. . | |
| 5,296,170 | 3/1994 | Sugimoto et al. . | |
| 5,520,764 | 5/1996 | Toney et al. . | |
| 5,532,053 | 7/1996 | Mueller . | |
| 5,587,204 | * 12/1996 | Kinsey, Jr. et al. | 427/411 |
| 5,811,185 | * 9/1998 | Schreck et al. | 427/536 |
| 5,812,316 | 9/1998 | Ochi et al. . | |
| 5,954,926 | * 9/1999 | Glocker et al. | 427/536 |
| 6,048,575 | * 4/2000 | Altavilla | 427/536 |

FOREIGN PATENT DOCUMENTS 9109730    11/1991    (JP) .

OTHER PUBLICATIONS

Richard Lewis, Sr., Ed., *Hawley's Condensed Chemical Dictionary, Twelfth Edition*; Van Nostrand Reinhold Co., N.Y., Excerpt p. 933, 1993 (no month).*

* cited by examiner

Primary Examiner—Marianne Padgett
(74) Attorney, Agent, or Firm—Welsh & Katz, Ltd.

(57) ABSTRACT

A method and apparatus for producing a polyethylene coated paperboard material with a mirror-pocket finish and a predetermined Dyne level is disclosed herein. The apparatus and method utilizes a double corona treatment on a single polyethylene surface to create the material with the predetermined Dyne level. Such paperboard material is often used for fabrication of cups, and the like. The predetermined Dyne level is required for printing requirements. The method and apparatus allow for the production of the predetermined Dyne level material at standard laminator operating speeds.

5 Claims, 7 Drawing Sheets

DOUBLE CORONA TREATMENT

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a process and apparatus for treating a polymer coated paperboard material. Specifically, the present invention relates to a process and an apparatus for double corona treating a polymer coated paperboard material.

2. Description of the Related Art

The fabrication of a paperboard material for certain packaging usually undergoes a process on a laminator where a polyethylene is extruded onto both surfaces of the paperboard material. While on the laminator, one or both surfaces of the paperboard material are subjected to a corona treatment. On certain grades of polymer-coated paperboard material, usually those with a reflective average (hereinafter "RA") of less that five which is mirror-like, it is very difficult to achieve an acceptable Dyne level from the corona treatment of the polymer-coated paperboard material. The smooth finish of the mirror pocket leaves the polyethylene very smooth making it difficult to print on the material at commercially acceptable levels. For comparison, a milk carton has a RA of 38 on the outside of the carton and 58 on the inside of the carton which are both relatively dull in comparison to a material having a RA of less than 5.

When processing a material with a RA of less than 5 on a laminator at a standard material speed of three hundred five meters per minute, a Dyne level of only thirty-eight Dyne per centimeter will be achieved on a conventional laminator. A Dyne level of at least forty-one Dyne per centimeter is required for printing at a commercially acceptable operating speed. In order to achieve such a Dyne level, the laminator would have to have its material speed reduced to less than one hundred eighty meters per minute, resulting in unacceptable (from a commercial perspective) laminator operating speeds. The Dyne level is a measurement of the surface tension of a material which is a mechanical force acting in the surface of the material.

Also, if the corona discharge has too great of power, the result will be pinholing in the material. Thus, there remains a need for producing a polymer-coated paperboard material with a Dyne level of at least 41 in a commercially viable manner.

BRIEF SUMMARY OF THE INVENTION

It is a primary object of the present invention to provide a method and apparatus for double corona treating a polymer-coated paperboard material.

It is an additional object of the present invention to provide a method and apparatus for producing a polymer-coated paperboard material with a predetermined Dyne level.

It is an additional object of the present invention to provide a method and apparatus for producing a polymer-coated paperboard material with a mirror-pocket finish of less than five RA, with a predetermined Dyne level.

It is an additional object of the present invention to provide a method and apparatus that increases production speed by as much as sixty-nine percent for producing a polymer-coated paperboard material with a mirror-pocket finish of less than five RA, with a Dyne level between 42–44.

One aspect of the present invention is a method for producing a polymer coated paperboard material with a predetermined Dyne level. The first step of the method is processing a paperboard material through a laminator at a predetermined speed. The method also includes extruding a first polymer layer onto a first surface of the paperboard material. The method also includes treating a surface of the first polymer layer of the paperboard material with a first corona treatment and treating the surface of the first polymer layer of the paperboard material with a second corona treatment subsequent to the first corona treatment. The first corona treatment and the second corona treatment impart a predetermined Dyne level to the surface of the first polymer layer. The predetermined Dyne level at least forty-one Dyne per centimeter.

Another aspect of the present invention is an apparatus for producing a polymer coated paperboard material with a predetermined Dyne level. The paperboard material is moved along a material pathway on the apparatus. The apparatus includes a gloss chill roll, a first extruder, a first corona treatment device, a second corona treatment device, a second extruder and a reel drum. The first extruder extrudes a first polymer layer onto the first surface of the paperboard material. The gloss chill roll imparts a predetermined level of gloss onto the first polymer layer of the paperboard material. The first corona treatment device is disposed subsequent to the first extruder along the material pathway and has a roller for exposing a surface of the first polymer layer of the paperboard material to a first corona treatment. The second extruder extrudes a second polymer layer onto a second surface of the paperboard material. The second extruder is disposed subsequent to the first extruder along the material pathway. The second corona treatment device is disposed subsequent to the first corona treatment device along the material pathway and has a roller for exposing the surface of the first polymer layer of the paperboard material to a second corona treatment. The reel drum is disposed at the end of the material pathway. The reel drum has a drive mechanism for rotating the reel drum at a predetermined speed and thereby moving the paperboard material at the predetermined speed. The first corona treatment and the second corona treatment impart a predetermined Dyne level to the surface of the first polymer layer of the paperboard material. The predetermined Dyne level is at least forty-one Dyne per centimeter. A preferred speed is at least three hundred meters per minute.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which.

DETAILED DESCRIPTION OF THE INVENTION

Figure 1:
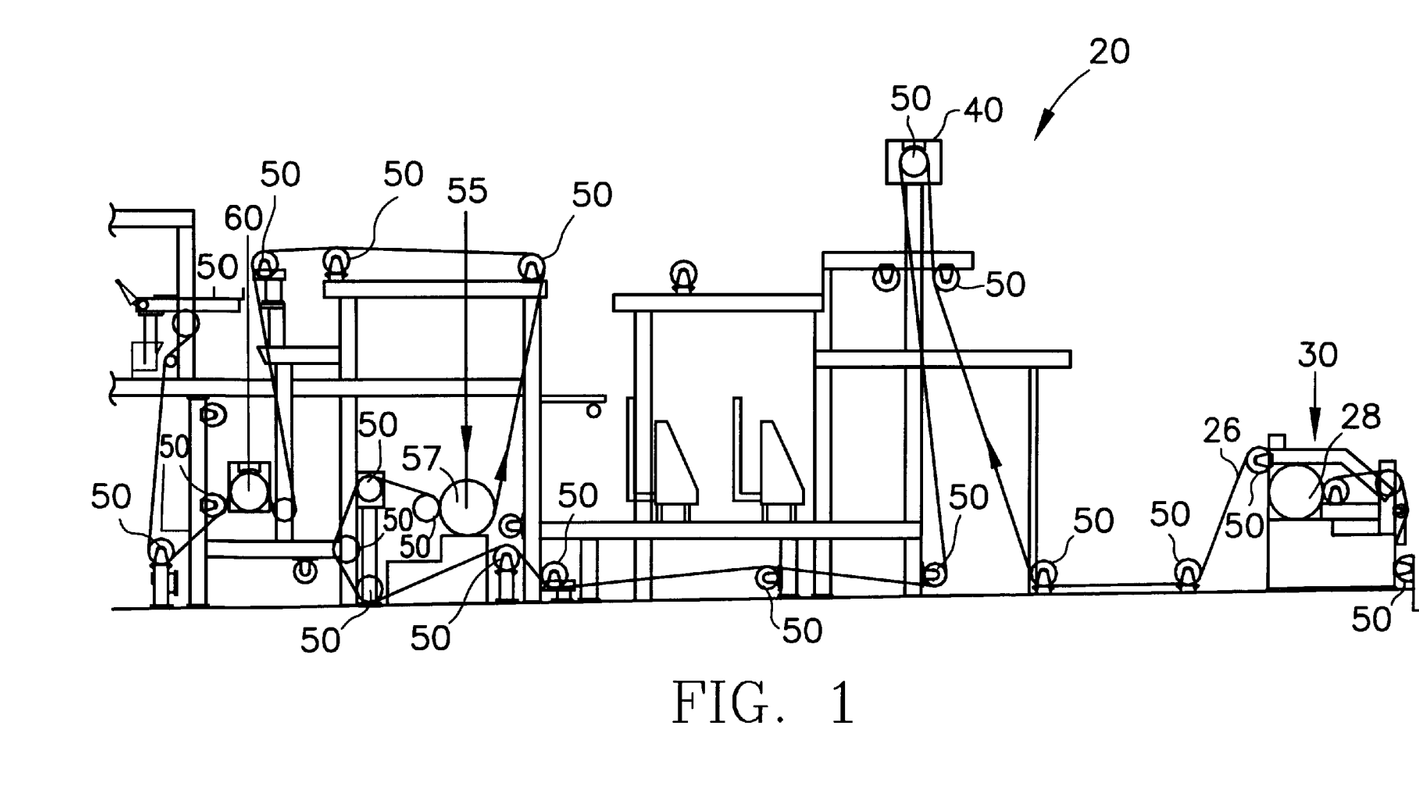
FIG. 1 is a schematic side view of the apparatus of the present invention.
Figure 2:
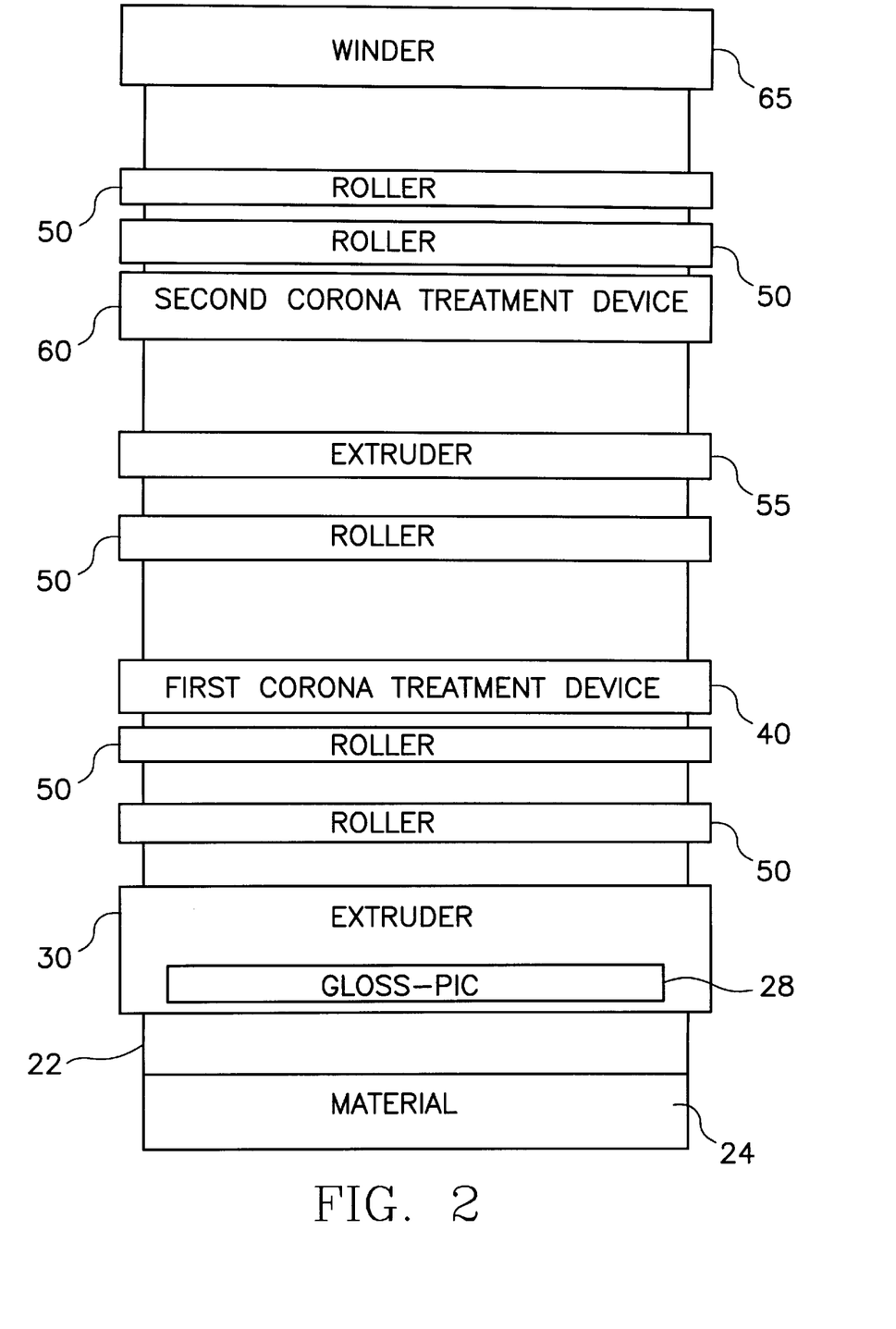
FIG. 2 is a schematic top plan view of the apparatus of the present invention.
Figure 3:
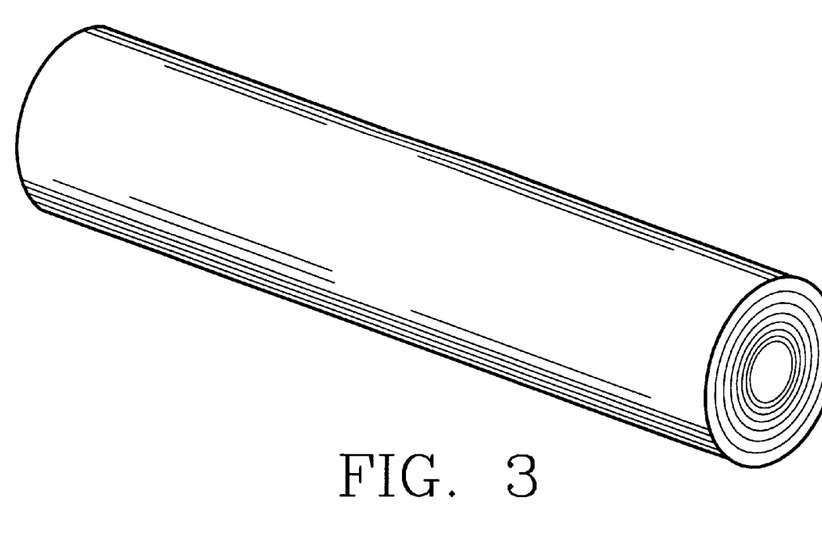
FIG. 3 is a top perspective view of a material roll.
Figure 4:
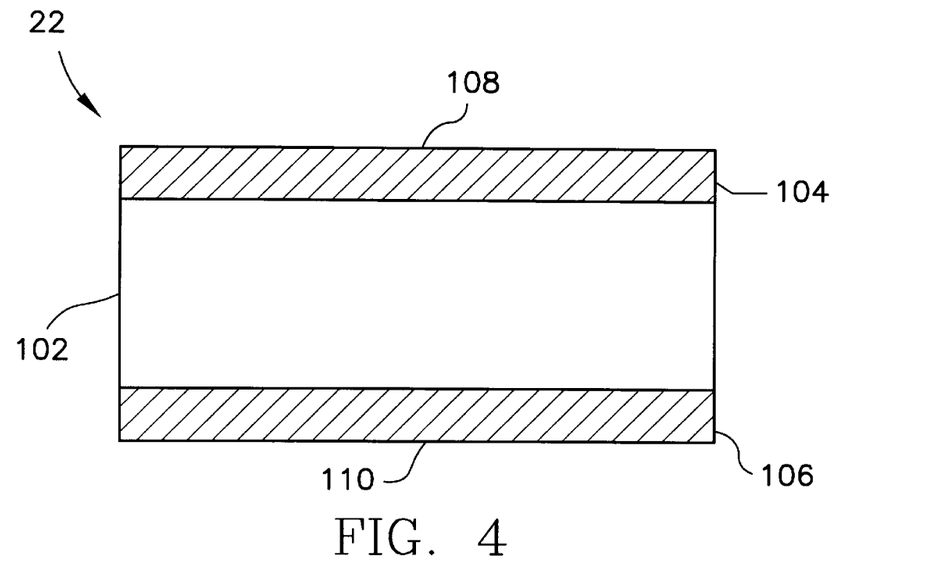
FIG. 4 is a cross-sectional view of processed material.

As shown in FIGS. 1 and 2, the apparatus is generally designated 20. The material 22 is unwound from a material roll 24 and processed along a material pathway 26 at a speed of approximately three hundred five meters per minute. The material roll 24, as shown in FIG. 3, begins the process as a single layer paperboard material 22. A preferred base material is bleached paperboard. The material roll 24 is unwound and moved through the apparatus 20 for processing into the final product. FIG. 4 shows a cross-section of the final material 22, and reference will be made to the various layers and surfaces illustrated in FIG. 4 while describing the process.

Figure 2A:
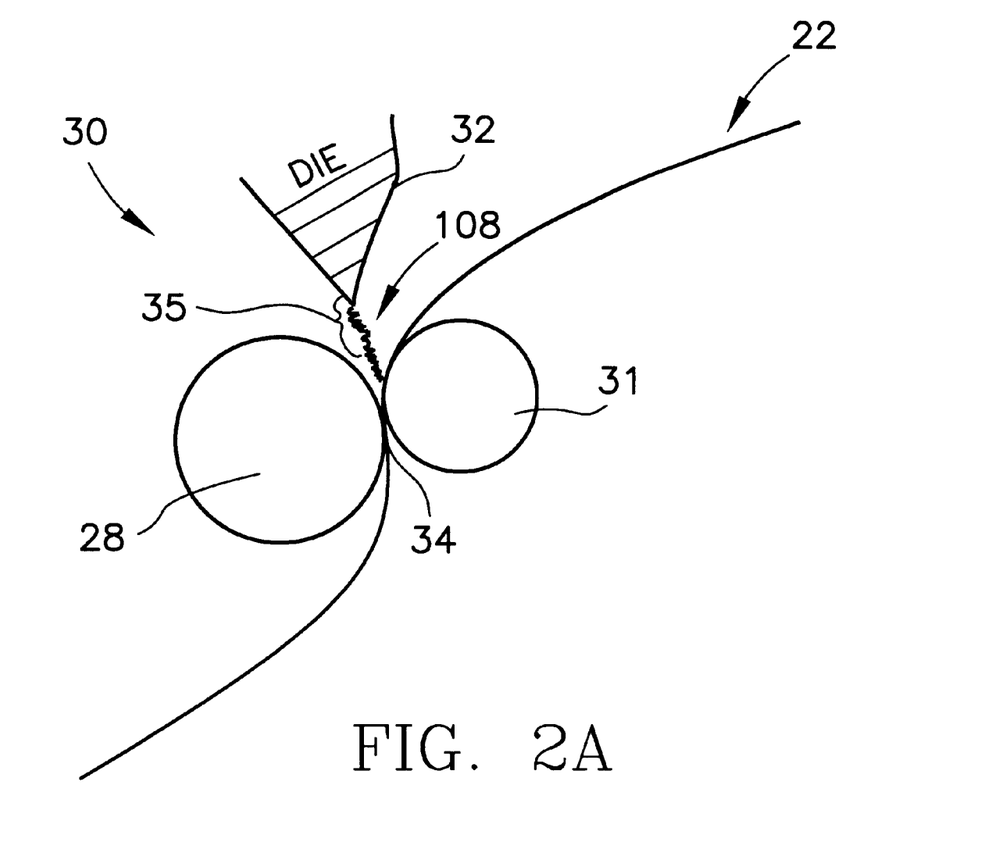
FIG. 2A is an isolated view of the super gloss chill roll at the extruder on the apparatus of FIG. 2.

In producing material for cup-stock, a first polymer material is extruded onto the paperboard base 102 at the first extruder 30. A preferred polymer material is low density polyethylene ("LDPE") such as DOW 50041 available from Dow Chemical. The polymer layer 104 is then subjected to a super gloss chill roll 28 to increase the RA of this surface 108 of the material 22. The super gloss chill roll 28 is located within the extruder 30. For cup-stock, the RA should be less than 5, which is mirror-like. If the material is being processed for milk cartons, a matte chill roll is utilized which imparts a RA of approximately 58. The chill rolls impart a "texture" to the polymer coated paperboard. This texture defines the appearance of the laminated material 22—shiny or dull. Converters of the material stock are particular about the appearance of the material since if affects the final print processing of the material. Whether for cups or cartons, the surface is becoming a preferred means of advertising, and thus the print must be of high quality. The two-layer laminate material 22 is now moved to the first corona treatment device 40.

Figure 2B:
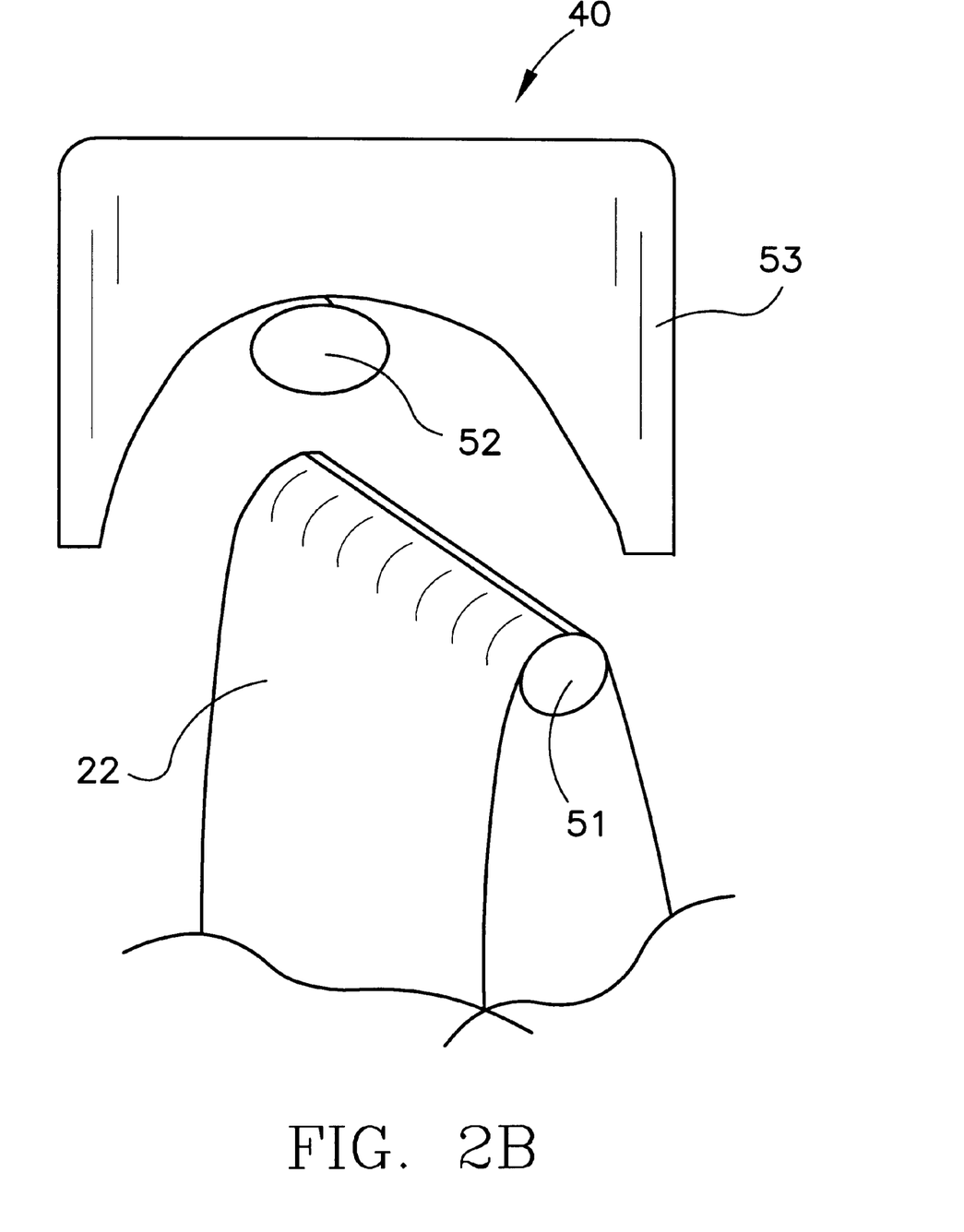
FIG. 2B is an isolated view of the corona treatment device of the apparatus of FIG. 2.

As shown in FIG. 2B, the super gloss chill roll 28 is disposed within the extruder 30 and opposed by a pressure roll 31. A die 32 is disposed above material 22 as it enters a "nip" 34 of the rolls 28 and 31. The chill roll 28 is a chrome-plated steel drum that may have a length of one hundred twenty-eight inches, a diameter of thirty inches and a weight of seven thousand five hundred pounds. The chrome plating has a specific RA texture, and a thickness of five to fifteen thousandths of inch. Chilled water flows through the roll 28 at five hundred gallons per minute at a temperature of approximately sixty to sixty-five degrees Fahrenheit. The roll 28 is driven at a speed that matches the reel drum 65.

The chill roll 28 is opposed by the pressure roll 31 that has a one-half to one inch thick coating of rubber material (45–60 durometer) on the steel drum. The rubber coating is relatively soft which creates the nip area 34 that is about one inch wide against the chill roll 28. The pressure roll 31 is forced against the chill roll 28 at a pressure of about of sixty to eighty pounds per square inch. The pressure roll also has water flowing through it, however, at a rate of about four hundred gallons per minute and a temperature of approximately sixty to sixty-five degrees Fahrenheit.

The die 32 extrudes the polyethylene onto the paperboard as it enters the extruder 30. The polyethylene 108 is extruded at a temperature of approximately six hundred fifteen degrees Fahrenheit. The drop height 35 is approximately four to six inches for oxidation purposes. The drop height 35 is measured from the tip of the die 32 to the nip 34. When the material 22 leaves the extruder 30, it is coated with the polyethylene layer 108.

The term corona treatment and the like as used herein refer to subjecting the polymer surfaces to corona discharge which is the ionization of a gas such as air in close proximity to the polymer surface. The ionization is initiated by a high voltage passed through a nearby electrode, and causing oxidation and other changes to the polymer surface. The corona treatment increases the surface tension of the polymer surface thereby enhancing its printability during a printing process.

As shown in FIG. 2B, the first corona treatment device 40 may be a bare electrode 52 with an insulated roller 51 on which the material 22 is positioned to have the polymer coated gloss surface 108 face the electrode 52 and hence be subjected to a corona discharge. The electrode 52 is held within a housing 53 of the device 40. Alternatively, a glass electrode with a bare metal roller may be utilized on the first corona treatment device 40, or a combination of both. A preferred first corona treatment device 40 has seventeen kilowatts of power, 230/355 Volts and 42/48 Amps, and is available from Pilar Technologies. The first corona treatment device 40 imparts a Dyne level of thirty-eight to the polymer gloss surface 108 of the material 22.

Throughout the apparatus 20 are a plurality of rollers which assist in maintaining the tension on the material as it undergoes processing, and also maneuver the material 22 to have one surface or the other surface of the material 22 face a processing station.

Next, the material 22 is moved to a second extruder 55 where a polymer layer is extruded onto a second surface 10 of the material 22 thereby creating a three layer laminate material 22. As with the first polymer layer 104, the second polymer layer 106 is preferably a LDPE. The second surface 110 is subjected to a gloss chill roll 57 which imparts an RA of approximately 38 to this second surface 110.

Figure 5:
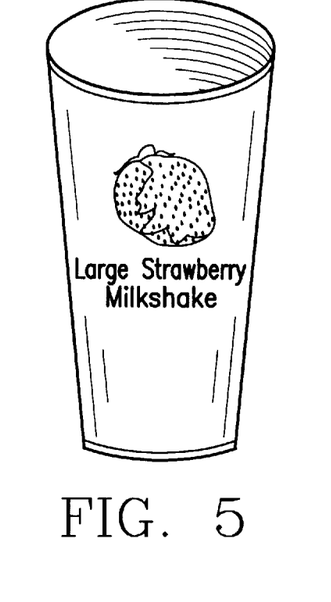
FIG. 5 is a top perspective view of a cup produced from the processed material.
Figure 6:
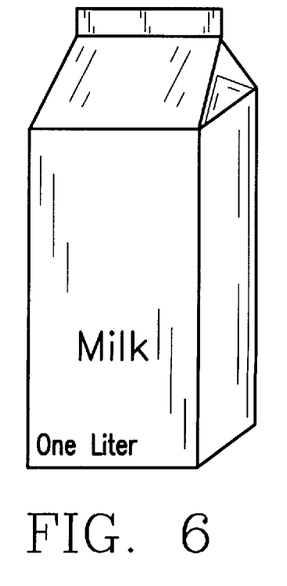
FIG. 6 is a top perspective view of a milk carton produced from the processed material.

Next, the material 22 is moved to the second corona treatment device 60 where the polymer gloss surface 108 is subjected to further corona treatment. A preferred second corona treatment device 60 has fifteen kilowatts of power, 230/355 Volts and 50.6/70 Amps, and is available from Pilar Technologies. The second corona treatment device 60 increases the Dyne level of the polymer gloss surface 108 to a Dyne level between forty-two and forty-four. The second corona treatment device 60 is Dyning on Dyne in that the Dyne level of the surface 108 is raised from 38 to as much as 44. The processing is then complete and the finished material 22 is rewound on a reel drum/winder 65. The finished roll of material is then ready for distribution to a converter for printing or further processing. FIGS. 5 and 6 show a printed cup 200 and a milk carton 202 fabricated from material 22 processed on the apparatus 20.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for producing a polymer coated paperboard material with a predetermined Dyne level, the method comprising:

processing a paperboard material through a laminator at a predetermined speed, the paperboard material having a first surface and a second surface;

extruding a first polymer onto the first surface of the paperboard material;

treating a surface of the first polymer layer of the paperboard material with a first corona treatment to a Dyne level of about 38;

extruding a second polymer layer onto the second surface of the paperboard material subsequent to treating the surface of the first polymer layer; and treating the surface of the first polymer layer of the paperboard material with a second corona treatment to a Dyne level of about 42 to about 44 subsequent to the first corona treatment;

whereby the first corona treatment and the second corona treatment impart the predetermined Dyne level to the surface of the first polymer layer of the paperboard material.

2. The method according to claim 1 further comprising glossing the first polymer layer of the paperboard material prior to the first corona treatment.

3. The method according to claim 1 wherein the predetermined speed is at least three hundred meters per minute.

4. The method according to claim 2 wherein the first polymer layer has a gloss of less than five RA.

5. The method according to claim 1 wherein the polymer coating is a low density polyethylene.

* * * * *